April 15, 1930.                H. A. SALLOP                1,754,772
                                 FASTENER
                         Original Filed Jan. 5, 1928
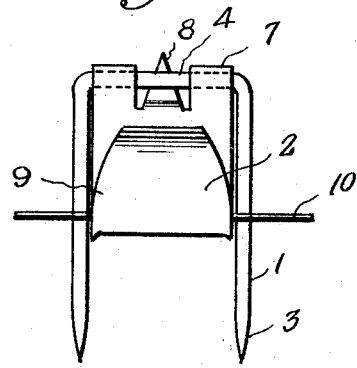
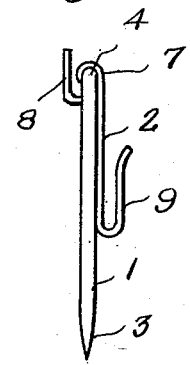
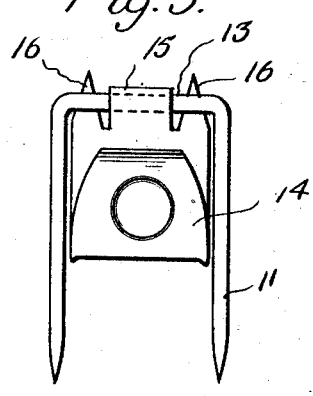
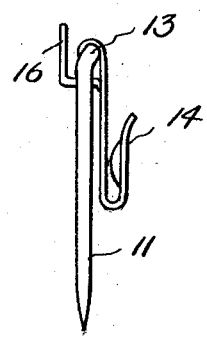
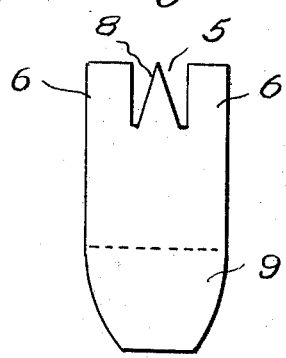
INVENTOR.
Harry A. Sallop
BY W. R. Smith
ATTORNEY Patented Apr. 15, 1930

1,754,772

UNITED STATES PATENT OFFICE

HARRY A. SALLOP, OF NEW YORK, N. Y.

FASTENER

Original application filed January 5, 1928, Serial No. 244,707. Divided and this application filed January 21, 1929. Serial No. 333,993.

This invention relates to a new type of fastener and more particularly to a design of fastener that will facilitate the application of upholstery covers to the body of an automobile, and has for its primary object the provision of a fastener that is capable of a better fastening engagement with upholstery covers and further capable of an effective interlocking engagement with the body structure of an automobile to prevent accidental dislocation of the fastener.

An object of the invention is the construction of a fastener of two adjustably related companion parts, one in the form of a pin, the other of a plate formation provided with penetrating prongs for interlocking engagement with a supporting structure.

Another object of this invention is the design and co-relation of the fastener element and the pin structure, whereby they may have relative movements for moving suitably placed penetrating prongs into and out of penetrating engagement with a supporting structure.

A feature of the invention resides in the novel manner of hinging the fastener element to the pin structure and locating the penetrating prongs so that the latter may move in an arc of a circle about the pivotal connection between the fastener element and the pin structure.

Besides the above my invention is distinguished in the simplified manner of designing and associating the component parts whereby the cost of manufacture is materially reduced, brought about by forming the fastener element from a single sheet of metal to provide hinge members penetrating prongs and a fastener element, and associating the fastener member with a U-shaped pin of one piece construction.

With these and other objects in view the invention will be better understood from the following detailed description taken in connection with the accompanying drawing, wherein Figure 1 is a front elevation of the fastener, Figure 2 is a side elevation, Figure 3 is a front elevation of a modification of the invention, Figure 4 is an edge elevation, Figure 5 is a plan view of the blank for forming the fastener element.

The present application is a division of my co-pending application, filed January 5, 1928, S. N. 244,707 and relates solely to a new type of fastener whereby automobile upholstery covers may be more quickly and effectively secured to the upholstery of an automobile.

Again referring to the drawing illustrating two of the many structures of my invention and more particularly to Figures 1 and 2, it will be noted that the fastener consists of two companion parts, hereinafter known as a pin structure 1 and a fastener element 2. The latter formed from sheet metal and the former of a length of wire bent to the required configuration. The pin structure 1 is of U-shaped formation to provide the limb 3, and the cross bar 4. The fastener element is formed from a single piece of sheet metal as illustrated in Figure 6, stamped to provide notches 5 that define extensions 6 that are ultimately formed into sleeves 7 engaging around the cross bar 4 to provide a pivotal connection between the fastener element and the pin structure. The arrangement of the notches 6 also provide a prong 8 so disposed with relation to the sleeves 7 and the cross bar 4 that with swinging movement of the fastener element relative to the pin structure, the prong 8 will move in an arc of a circle relative to the center of the cross bar, thereby enabling the prong 8 to move into and out of interlocking engagement with a supporting structure in the swinging of the fastener element toward and away from the pin structure. In giving the final formation to the fastener element, a fastener member 9 is bent into a predetermined relation with the body of the fastener element to enable effective fastening engagement with an article to be supported. At this point I wish to call attention to the fact that the fastener member 9 may be of the formation shown in the drawing for snap engagement with an article to be supported or with the connector 10 as shown and described in my above mentioned co-pending application, or may be given various other forms well known in the art.

In Figures 3, 4 and 5 I have illustrated a pin structure 11 as provided with an offset portion to laterally displace the cross bar 13 so that the fastener element 14 may be displaced laterally relative to the pin structure. In this particular showing, I illustrate a single sleeve or hinge member 15 and a pair of penetrating prongs 16 so disposed as to function similar to the action of the pentrating prong 8.

With the fastener element hinged to the pin structure as illustrated in the drawing, it will be appreciated that the fastener element may be swung upwardly into a supporting structure such as the upholstery of an autombile. When this has been accomplished, the fastener element is swung downwardly into parallel relation with the pin structure which automatically forced the penetrating prong into the upholstery to assume interlocking position to prevent movement of the fastener upwardly, which would dislocate the pin structure from the upholstery. It is of course understood that when the fastener is to be removed it is only necessary to swing the fastener element upwardly to automatically swing the prong in an arc of a circle out of its relation with the upholstery which enables the pin structure to be readily removed.

Particular attention is called to the simplified construction of the component parts and mode of assemblage which enables the fastener element to be readily stamped from sheet metal at a low production cost and shaped to have a swinging connection with the pin structure, also of a simplified formation to reduce production costs. Although my copending application illustrates my improved fastener designed for detachable engagement with a resilient support, it is readily understood that various forms of fastener members may be substituted as a mechanical equivalent of the fastener element 2 and the fastener element may be of designs and constructions different than illustrated to have various other types of hinge connection with the pin structure and therefore I do not desire to be limited in protection in any manner whatsoever except as set forth in the following claims.

I claim:

1. A fastener comprising a double pointed pin having a U-shaped head including a cross bar, a plate having a fastener element and a hinged member applied to the cross bar between the limbs of the pin and a locking element on the plate extending rearwardly therefrom.

2. A fastener comprising a double pointed pin having a head, affording a cross bar and a plate hinged to the cross bar between the limbs of the pin and extending laterally beyond the limbs of the pin and beyond the hinged connection and provided with pin locking means.

3. A fastener comprising a double pointed pin having a head affording a cross bar and a plate hinged to the cross bar between the limbs of the pin and provided with a rearwardly extending prong adjacent to the cross bar of the pin head and extending upwardly when in use.

In witness whereof I have hereunto set my hand.

HARRY A. SALLOP.